(12) United States Patent
Poremba

(10) Patent No.: US 9,467,559 B2
(45) Date of Patent: *Oct. 11, 2016

(54) SPECIAL EMERGENCY CALL TREATMENT BASED ON THE CALLER

(71) Applicant: TeleCommunication Systems, Inc., Annapolis, MD (US)

(72) Inventor: Todd Poremba, Seattle, WA (US)

(73) Assignee: Telecommunications Systems,, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,561

(22) Filed: Jan. 20, 2016

(65) Prior Publication Data

US 2016/0142535 A1 May 19, 2016

Related U.S. Application Data

(63) Continuation of application No. 13/705,276, filed on Dec. 5, 2012, now Pat. No. 9,264,537.

(60) Provisional application No. 61/566,928, filed on Dec. 5, 2011.

(51) Int. Cl.
| | |
|---|---|
| H04M 11/04 | (2006.01) |
| H04M 3/22 | (2006.01) |
| H04M 3/436 | (2006.01) |
| H04M 3/51 | (2006.01) |
| H04M 3/493 | (2006.01) |
| H04W 4/22 | (2009.01) |

(52) U.S. Cl.
CPC ............ *H04M 3/2281* (2013.01); *H04M 3/436* (2013.01); *H04M 3/493* (2013.01); *H04M 3/5116* (2013.01); *H04W 4/22* (2013.01); *H04M 2201/14* (2013.01); *H04M 2203/551* (2013.01); *H04M 2242/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,302,250 | B2 * | 11/2007 | Chin | H04M 3/436 455/404.1 |
| 2006/0025158 | A1 * | 2/2006 | Leblanc | G01C 21/206 455/456.2 |
| 2009/0049529 | A1 * | 2/2009 | Felger | H04M 15/68 726/4 |
| 2011/0211682 | A1 * | 9/2011 | Singh | H04M 1/57 379/142.05 |

* cited by examiner

*Primary Examiner* — Duc Nguyen
*Assistant Examiner* — Assad Mohammed
(74) *Attorney, Agent, or Firm* — Tarolli, Sundheim, Covell & Tummino LLP

(57) ABSTRACT

A blacklist of known harassing or non-legitimate emergency calls is maintained. An incoming emergency call is checked against emergency call records to determine if multiple emergency calls have been made recently, from the same general location, and destined to the same PSAP. Feedback is provided regarding the number of recent calls made and the possibility of a false positive, based on call history from known handsets in the area, including the possibility of a phone with a known MEID/ESN, when powered up, receiving the same 911-xxx-xxxx. Blacklisting may be approved or not based on the feedback. A telephone number or MIN may be placed on a "blacklist" with a 'timer'. Subsequent calls to that phone number will be assigned a different SIP URI (a unique URI per destination determined prior to lookup on the blacklist) and be directed elsewhere. The call may be completed to an administrative line.

17 Claims, 2 Drawing Sheets

SPECIAL EMERGENCY CALL TREATMENT BASED ON THE CALLER

The present application is a continuation of U.S. application Ser. No. 13/705,276, entitled "Special Emergency Call Treatment Based on the Caller", filed on Dec. 5, 2012; which claims priority from U.S. Provisional No. 61/566,928, entitled "Special Emergency Call Treatment Based on the Caller", filed Dec. 5, 2011, to Todd Poremba, the entirety of both of which are explicitly incorporated herein by reference.

BACKGROUND OF THE INVENTION

1. Field of the Invention

This invention relates generally to telecommunications. More particularly, it relates to public safety.

2. Background of Related Art

There are many handsets that do not register for service with any Commercial Mobile Radio Service (CMRS) carrier. Such handsets are referred to as non-initialized, or non-service initialized (NSI) handsets. Even without a registered CMRS carrier non-initialized handsets are permitted to complete emergency calls to 9-1-1 because there is too great a risk that registration of a legitimate subscriber may fail when roaming onto another carrier's network, and this as a matter of public policy should not prevent the subscriber from placing an emergency call. Moreover, handsets do not register instantly after being powered on, and an emergency call for help should not be delayed while waiting for the completion of registration otherwise necessary for commercial services.

Some handsets may be lost, stolen, thrown away, etc. and may be used by unknown individuals for malicious purposes. Emergency calls to 9-1-1 from these handsets are no longer properly linked to an individual having pre-registered location information, and as such an emergency call made by someone other than the pre-registered person may not be reliably or easily traced to a precise location associated with the current use of the handset. Furthermore, subsequent unknown (to the carrier) individuals making use of a lost, stolen, etc. handset can make numerous anonymous harassing calls to 9-1-1 using these phones, and there is little chance of discovering the identity of the unauthorized individual. Harassing calls to emergency services are made with more frequency than would be thought, and interfere with day-to-day Public Safety operations, posing a risk to legitimate callers and responders, By the time a harassing emergency call reaches a selective router, the only identification of the initiating handset is the dialed digits (e.g., "911") followed by a representation of the last seven digits of the phone's electronic ID; this number is sometimes represented as 911-xxx-xxxx. There are only 10 million possible numbers (000-0000 through 999-9999) to differentiate between over an estimated 400 million wireless phones in the U.S. In other words, if electronic identification numbers were evenly distributed, there would be 40 phones that would have the same 911-xxx-xxxx. Because of this, blockage of emergency calls from known harassing handsets is not desirable in the rare (but possible) event that a handset with a different area code (but the same seven digits xxx-xxxx) attempts to make a legitimate emergency call. Plus, some 9-1-1 calls come from handsets that have recently powered up, and not all calls from a particular 911-xxx-xxxx can be blocked indefinitely.

Some solutions have been described from within the carrier networks. Others have attempted to solve the problem from within an E9-1-1 network. None are known to have been implemented.

Exemplary emergency call blocking techniques are described in co-owned U.S. Pat. No. 8,103,242 entitled "E911 Call Blocking For Non-Initialized Wireless Telephones" to Richard Dickinson; U.S. Pat. No. 8,175,570 entitled "E911 Call Blocking For Non-Initialized Wireless Telephones" to Richard Dickinson; and U.S. Pat. No. 8,116,722 entitled "E911 Call Blocking For Non-Initialized Wireless Telephones" to Richard Dickinson.

Disadvantages of the present technologies include the fact that carrier facing solutions require costly changes within carrier networks, and public Safety solutions risk inadvertent blockage of non-offending legitimate emergency callers.

SUMMARY OF THE INVENTION

A method and apparatus for blacklisting a probable source of a harassing or otherwise non-legitimate emergency call comprises requesting a check of an incoming emergency call against emergency call records to determine if multiple emergency calls have been made recently all from a same source, all from a same general location, and all destined to a same public safety answering point (PSAP). Feedback is received regarding a possibility of the incoming emergency call being a non-legitimate call, and an identifying telephone number or mobile identification number (MIN) of the source is added to a blacklist when the possibility is beyond an acceptable threshold amount.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

The present invention provides for the combination of 1) 911-xxx-xxxx of a non-service initialied (NSI) handset with 2) a destination PSAP, 3) the caller's coarse location, 4) a call history, and 5) PSAP personnel input, harassing (i.e., non-legitimate) emergency calls can be safely and reliably blocked, with the risk of an improper blockage (a "false positive") being reduced significantly.

With a NENA defined NG9-1-1 network, a custom header is implemented in a Location to Service Translation query (i.e.: the 911-xxx-xxxxx for a non-service initialized (NSI) handset). A query is made to a supplemental policy store (or a similar query is made to an alternate data source) to identify a given telephone number (TN) mobile identification (MIN), etc., (e.g. a 911-xxx-xxxx) as being on a "blacklist" of known sources of harassing (i.e., non-legitimate) emergency calls.

The blacklist of known sources of harassing or non-legitimate emergency calls may be created by appropriate public safety personnel, e.g., over a web-interface. The entered telephone number is checked against emergency call records to determine if multiple emergency calls had been made recently, all from approximately the same location, and destined to the same PSAP.

The web interface provides relevant feedback such as the number of recent emergency calls made, and the possibility of a false positive (based on emergency call history from known handsets in the area, including the possibility of a handset (mobile phone) with a known mobile equipment identifier (MEID)/electronic serial number (ESN), when powered up, receiving the same 911-xxx-xxxx).

Public safety answering point (PSAP) personnel can approve the blacklisting or not based on the feedback. Moreover, or alternatively, the blacklisting may be automated based on a match to predetermined criteria, at the discretion of the authorized public safety authority.

If, according to the preferred configuration, enough of the above factors are present, the telephone number, MIN, etc. may be placed on the "blacklist" with a configured timer associated therewith. Subsequent calls to that phone number are assigned a different SIP URI (a unique URI per destination determined prior to lookup on the blacklist), and are directed to an interactive voice recording (IVR) system (registered to multiple SIP URIs). The interactive voice recording explains that the caller has been identified as known to have recently made an illegitimate or otherwise harassing emergency call(s). The caller will then be given the opportunity to interact with the system to complete a call to the PSAP (or other call center) with a lower priority.

In the case of a PSAP, the call may be routed to a line monitored by administrative personnel instead of a dedicated emergency 9-1-1 trunk line.

Figure 1:
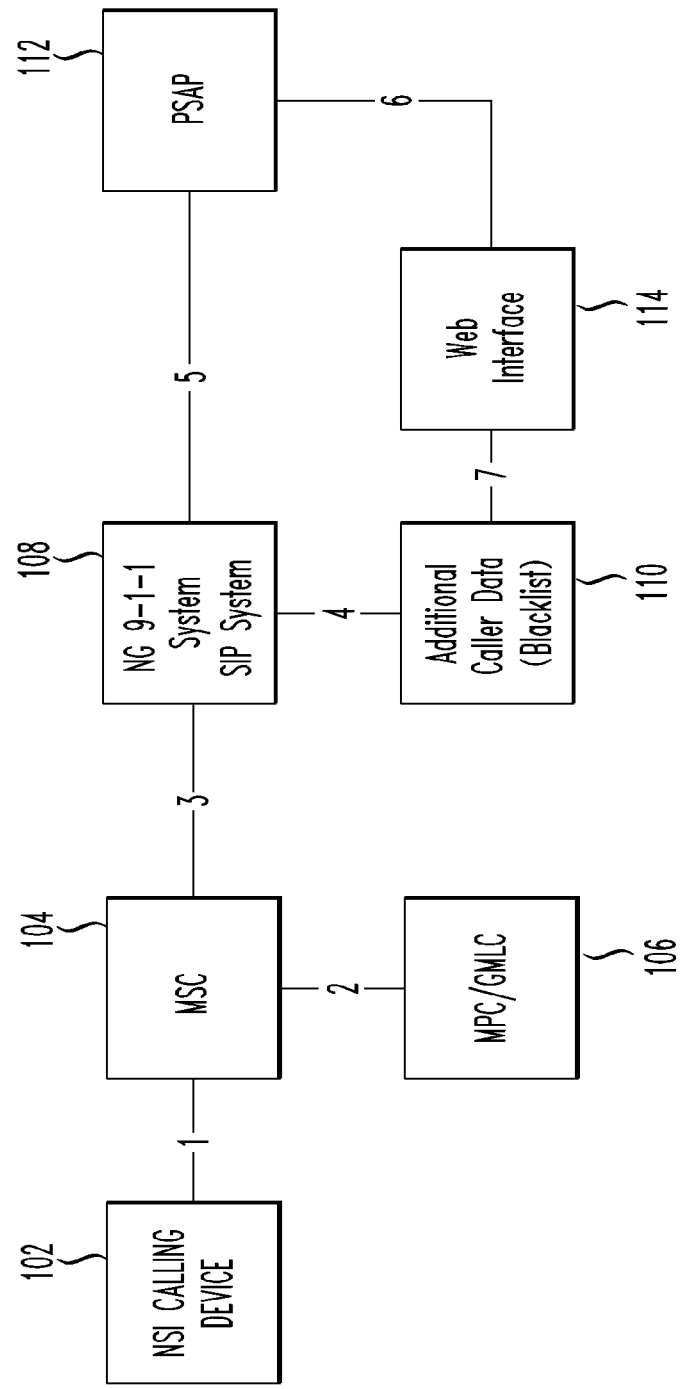
FIG. 1 shows special emergency call treatment based on a given non-service initialized calling device, in accordance with the principles of the present invention.

FIG. 1 shows special emergency call treatment based on a given non-service initialized calling device, in accordance with the principles of the present invention.

In particular, as shown in step 1 of FIG. 1, a non-service initialized calling device 102 attempts to place an emergency call (e.g., to "9-1-1").

In step 2, cell tower data (and potentially other data such as a mobile equipment identifier (MEID) or electronic serial number (ESN)) are delivered from a mobile switching center MSC 104 to a mobile positioning center (MPC) (or gateway mobile location center (GMLC)) 106, and the mobile positioning center (MPC)/(GMLC) 106 returns routing instructions.

In step 3, a next generation 9-1-1 (NG9-1-1) system SIP system 108 receives the call and performs initial call treatment. In step 4, the selected public safety answering point (PSAP) 112 is determined to have a blacklist, which is then queried for a match to the calling number of the present emergency call. In this given example, the calling number of the present emergency non-initialized service (NSI) call does not match any current number in the blacklist.

In step 5, the non-initialized emergency call is completed to the PSAP 112.

In step 6, after a given number (e.g., several) emergency calls are received (e.g., within a given time) from the same non-service initialized (NSI) device 102, the PSAP 112 enters the known information about the harassing non-service initialized (NSI) device (e.g., its telephone number, MIN, etc.) into an appropriate non-service initialized (NSI) web interface 114.

In step 7, call logs are reviewed, and the number of emergency calls, logged location of each of the emergency calls, and the known possibility of each call being a false positive, is determined and recorded. The PSAP 112 makes a determination to commit the entry of the telephone number, MIN, etc. of the non-service initialized caller into the blacklist for that specific PSAP 112.

Figure 2:
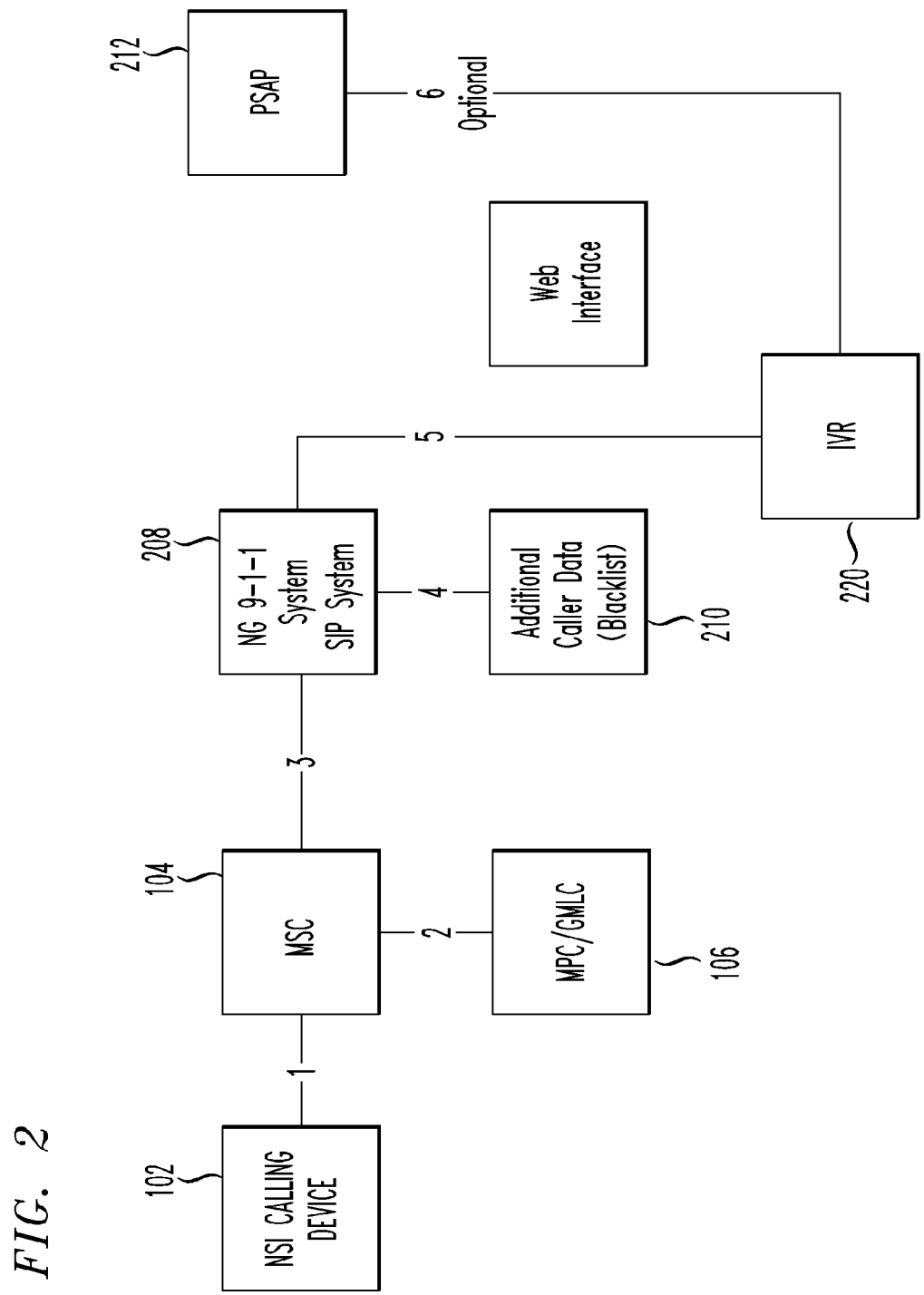
FIG. 2 shows another embodiment of special emergency call treatment based on a given non-service initialized calling device, in accordance with the principles of the present invention.

FIG. 2 shows another embodiment of special emergency call treatment based on a given non-service initialized calling device, in accordance with the principles of the present invention.

In particular, as shown in step 1 of FIG. 2, the non-service initialized (NSI) call is dialed.

In step 2, cell tower and potentially other data (such as a mobile equipment identifier (MEID) or electronic serial number (ESN)) are delivered to the MPC/GMLC and the MPC/GMLC returns routing instructions.

In step 3, NG9-1-1 receives the call and performs initial call treatment.

In step 4, the public safety answering point (PSAP) selected is determined to have a blacklist. This blacklist is checked. In this example, the blacklist matches the non-service initialized (NSI) call. The public safety answering point's (PSAP's) SIP universal resource indicator (URI) is replaced with a SIP URI specific to that PSAP but which routes to the interactive voice recording (IVR).

In step 5, the interactive voice recorder plays a recorded message

In step 6, after several calls from the same non-service initialized (NSI) call, the public safety answering point (PSAP) personnel enter the information into the non-service initialized (NSI) web interface.

In step 7, call logs are checked and the number of calls, locations of the calls, and the known possibility of false positives is determined and recorded. The PSAP personnel decide to commit the entry of the telephone number, MIN, etc. into the blacklist for that specific public safety answering point (PSAP).

While the invention has been described with reference to the exemplary embodiments thereof, those skilled in the art will be able to make various modifications to the described embodiments of the invention without departing from the true spirit and scope of the invention.

What is claimed is:

1. A method of blocking a source device of a probable nonlegitimate emergency call, comprising:
   receiving an incoming emergency call from a physical wireless device associated with a given location;
   initiating a request to a caller data server in communication with a blacklisted caller database to perform a lookup of other emergency call records recently made from a same general location as said given location, and all routed to a same public safety answering point (PSAP);
   comparing said incoming emergency call to said emergency call records to determine if multiple emergency calls have been made recently from said physical wireless device;
   receiving a feedback message regarding a probability of said received emergency call being a non-legitimate emergency call; and
   adding, to said blacklisted caller database, an identifying telephone number or mobile identification number (MIN) of said physical wireless device when said probability is beyond an acceptable threshold amount.

2. The method of blocking a source device of a probable non-legitimate emergency call according to claim 1, further comprising:
   assigning a different Session Initiation Protocol (SIP) Uniform Resource Identifier (URI) per destination for a subsequent emergency call received from said physical wireless device, determined prior to said lookup in said blacklisted caller database.

3. The method of blocking a source device of a probable non-legitimate emergency call according to claim 2, wherein:
said subsequent emergency call is directed to a voice recording system.

4. The method of blocking a source device of a probable non-legitimate emergency call according to claim 3, wherein:
said voice recording system is an interactive voice recording system.

5. The method of blocking a source device of a probable non-legitimate emergency call according to claim 3, wherein:
said voice recording system is registered to multiple Session Initiation Protocol (SIP) Uniform Resource Identifiers (URIs).

6. The method of blocking a source device of a probable non-legitimate emergency call according to claim 3, wherein:
said voice recording system indicates that a source of said emergency call has been identified as having previously made a non-legitimate emergency call.

7. The method of blocking a source device of a probable non-legitimate emergency call according to claim 1, further comprising:
lowering a priority of said received emergency call with respect to other incoming emergency calls when said probability of said incoming emergency call is above said acceptable threshold amount.

8. The method of blocking a source device of a probable non-legitimate emergency call according to claim 1, wherein:
said acceptable threshold amount is predetermined before said incoming emergency call is received.

9. The method of blocking a source device of a probable non-legitimate emergency call according to claim 1, wherein:
said received feedback message includes a number of recent emergency calls made from said physical wireless device.

10. The method of blocking a source device of a probable non-legitimate emergency call according to claim 1, further comprising:
blacklisting said telephone number or MIN associated with said received emergency call based on said received feedback message.

11. The method of blocking a source device of a probable non-legitimate emergency call according to claim 1, wherein:
said identifying telephone number or MIN is a 911-xxx-xxxx number.

12. Apparatus for blocking a source device of a probable non-legitimate emergency call, comprising:
means for receiving an incoming emergency call from a physical wireless device associated with a given location;
means for initiating a request to a caller data server in communication with a blacklisted caller database to perform a lookup of other emergency call records recently made from a same general location as said given location, and all routed to a same public safety answering point (PSAP);
means for comparing said incoming emergency call to said emergency call records to determine if multiple emergency calls have been made recently from said physical wireless device;
means for receiving a feedback message regarding a probability of said received emergency call being a non-legitimate emergency call; and
means for adding, to said blacklisted caller database, an identifying telephone number or mobile identification number (MIN) of said physical wireless device when said probability is beyond an acceptable threshold amount.

13. The apparatus for blocking a source device of a probable non-legitimate emergency call according to claim 12, wherein:
means for assigning a different Session Initiation Protocol (SIP) Uniform Resource Identifier (URI) per destination for a subsequent emergency call received from said physical wireless device, determined prior to said lookup in said blacklisted caller database.

14. The apparatus for blocking a source device of a probable non-legitimate emergency call according to claim 13, wherein:
means for indicating with a voice recording system that a source of said subsequent emergency call has been identified as having previously made a non-legitimate emergency call.

15. The apparatus for blocking a source device of a probable non-legitimate emergency call according to claim 12, further comprising:
means for lowering a priority of said received emergency call with respect to other incoming emergency calls when said probability of said incoming emergency call is above said acceptable threshold amount.

16. The apparatus for blocking a source device of a probable non-legitimate emergency call according to claim 12, wherein:
said acceptable threshold amount is predetermined before said incoming emergency call is received.

17. The apparatus for blocking a source device of a probable non-legitimate emergency call according to claim 12, wherein:
said received feedback message includes a number of recent emergency calls made from said physical wireless device.

* * * * *